United States Patent
Wainwright

[11] Patent Number: 5,259,584
[45] Date of Patent: *Nov. 9, 1993

[54] CAMERA MOUNT FOR TAKING PANORAMIC PICTURES HAVING AN ELECTRONIC PROTRACTOR

[76] Inventor: Andrew G. Wainwright, P.O. Box 278, Red Hook, N.Y. 12571

[*] Notice: The portion of the term of this patent subsequent to Aug. 20, 2008 has been disclaimed.

[21] Appl. No.: 726,269

[22] Filed: Jul. 5, 1991

Related U.S. Application Data

[63] Continuation-in-part of Ser. No. 548,238, Jul. 5, 1990, Pat. No. 5,040,759.

[51] Int. Cl.[5] .............................................. G03B 37/00
[52] U.S. Cl. ....................................... 248/542; 33/1 N; 33/1 PT; 33/569; 248/186; 248/187; 248/289.1; 354/94; 354/293
[58] Field of Search ............. 248/186, 187, 176, 289.1, 248/349, 542; 354/94, 292, 293, 294; 33/1 N, 1 PT, 568, 569, 570

[56] References Cited

U.S. PATENT DOCUMENTS

| | | | |
|---|---|---|---|
| 1,503,437 | 7/1924 | James | 354/94 |
| 4,135,305 | 1/1979 | Krause | 33/570 |
| 4,442,606 | 4/1984 | Graham et al. | 33/1 N |
| 4,453,691 | 6/1984 | Hochstatter | 248/542 |
| 4,492,031 | 1/1985 | Koenuma | 33/1 N X |
| 5,040,298 | 8/1991 | Weber | 33/1 N |
| 5,040,759 | 8/1991 | Wainwright | 248/186 |

Primary Examiner—David A. Scherbel
Assistant Examiner—Derek J. Berger
Attorney, Agent, or Firm—Abdallah & Muckelroy

[57] ABSTRACT

A camera mount for taking panoramic pictures. A camera mounting plate is rotatably attached to a tripod mounting plate in a manner permitting the camera mounting plate to sweep an arc of rotation along the top surface of the tripod mounting plate. The tripod mounting plate has a convexly-curved forward edge and a protractor disposed adjacent the forward edge. A stationary detent is fixedly attached adjacent to the center of the protractor and a plurality of adjustable detents are disposed to each side of the stationary detent within respective detent slots disposed along the arc of rotation adjacent to the protractor. The camera mounting plate includes a camera mounting block that can be adjusted rearwardly and forwardly upon the camera mounting plate. A pointer integrally formed as part of the camera mounting plate includes a transparent eyeglass disposed above the protractor having a datum to facilitate alignment of the pointer with the protractor. A bubble level is also provided to facilitate leveling of the camera mounted on the device of the present invention. A rotary incremental optical encoder is attached to the camera mounting plate for converting angular displacement of the camera mounting plate into digital readout.

15 Claims, 2 Drawing Sheets

CAMERA MOUNT FOR TAKING PANORAMIC PICTURES HAVING AN ELECTRONIC PROTRACTOR

This application is a continuation-in-part of U.S. Ser. No. 548,238 filed Jul. 5, 1990 and entitled "Camera Mount For Taking Panoramic Pictures," now U.S. Pat. No. 5,040,759. The disclosure of the parent application U.S. Pat. No. 5,040,759 is incorporated by reference.

BACKGROUND OF THE INVENTION

The present invention generally relates to camera mounts and in particular to camera mounts for taking panoramic pictures. More specifically, the invention of the present disclosure relates to a camera mount having electronic means for verifying the position of a camera disposed on the camera mount.

Visually aligning a camera at various angular positions by mechanical means as disclosed in co-pending U.S. application, Ser. No. 548,238, is subject to human error. Alignment inconsistencies also result when the camera mount is used by different photographers due to natural human differences in visual perception and tactile sensitivity. These limitations can be overcome by using electronic position verification means.

SUMMARY OF THE INVENTION

The camera mount of the present invention includes a stationary tripod mounting plate, a camera mounting plate rotatably attached to the tripod mounting plate, and a rotary encoder operably attached to the camera mounting plate to measure the angular displacement of the camera mounting plate and convert this measurement into a readable digital output.

An object of the present invention is to provide a camera mount for taking panoramic pictures.

Another object of the present invention is to provide a camera mount having respective angular position measuring means of increasing accuracy.

Another object of the present invention is to provide a camera mount having angular position measuring means which reduce human error in the positioning of a camera for taking panoramic pictures.

It is also on object of the present invention to provide a camera mount including an optical encoder for digital display of angular positions of a camera.

A still further object of the present invention is to provide a portable camera mount that can be used with a wide range of lens for production of slide panoramas for multi-screen slide presentations.

These and other objects and advantages of the camera mount of the present disclosure will be readily understood by those skilled in the art from the following description of a preferred embodiment, claims and appended drawings.

DESCRIPTION OF A PREFERRED EMBODIMENT

Figure 1:
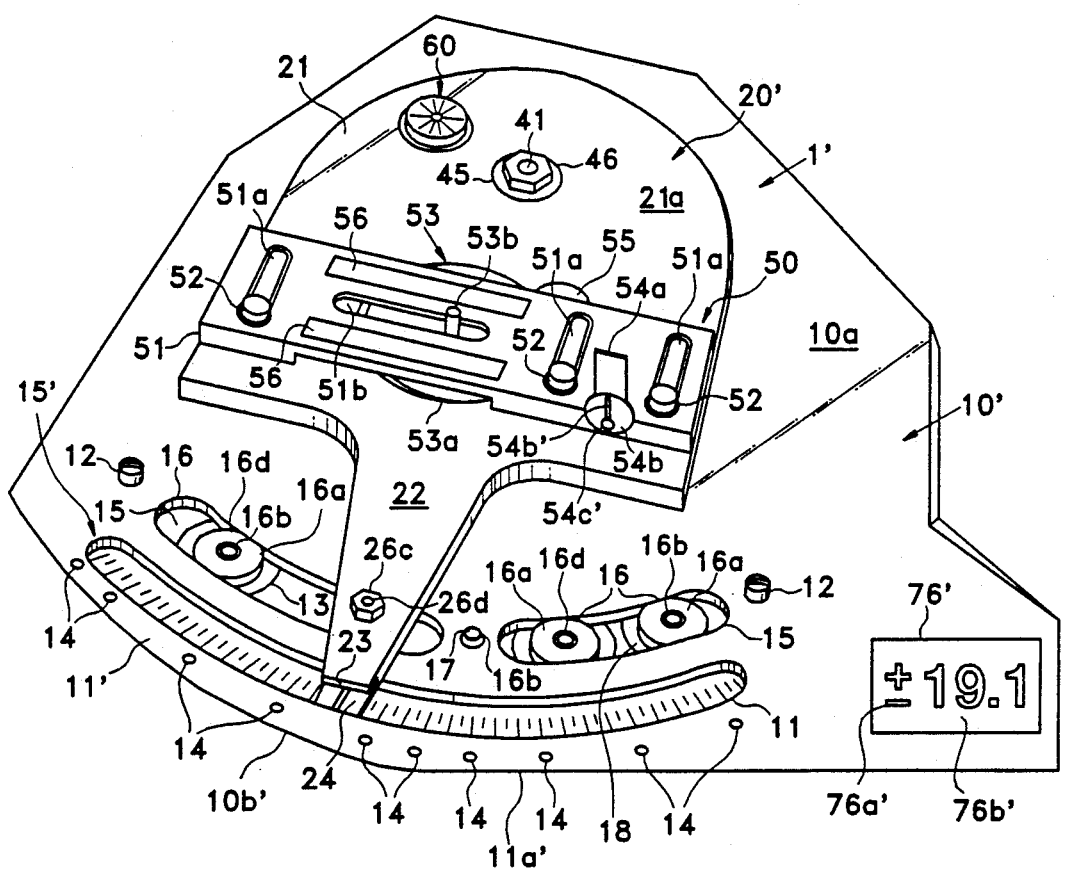
FIG. 1 is a top perspective view of a second embodiment of the camera mount of the present invention.

FIG. 1 illustrates a second preferred embodiment of the panoramic camera mount 1' of the present invention. Second panoramic camera mount 1' is formed substantially the same as camera mount 1 illustrated and described in the parent application, generally comprising a second tripod mounting plate 10' and a second camera mounting plate 20'.

Figure 2:
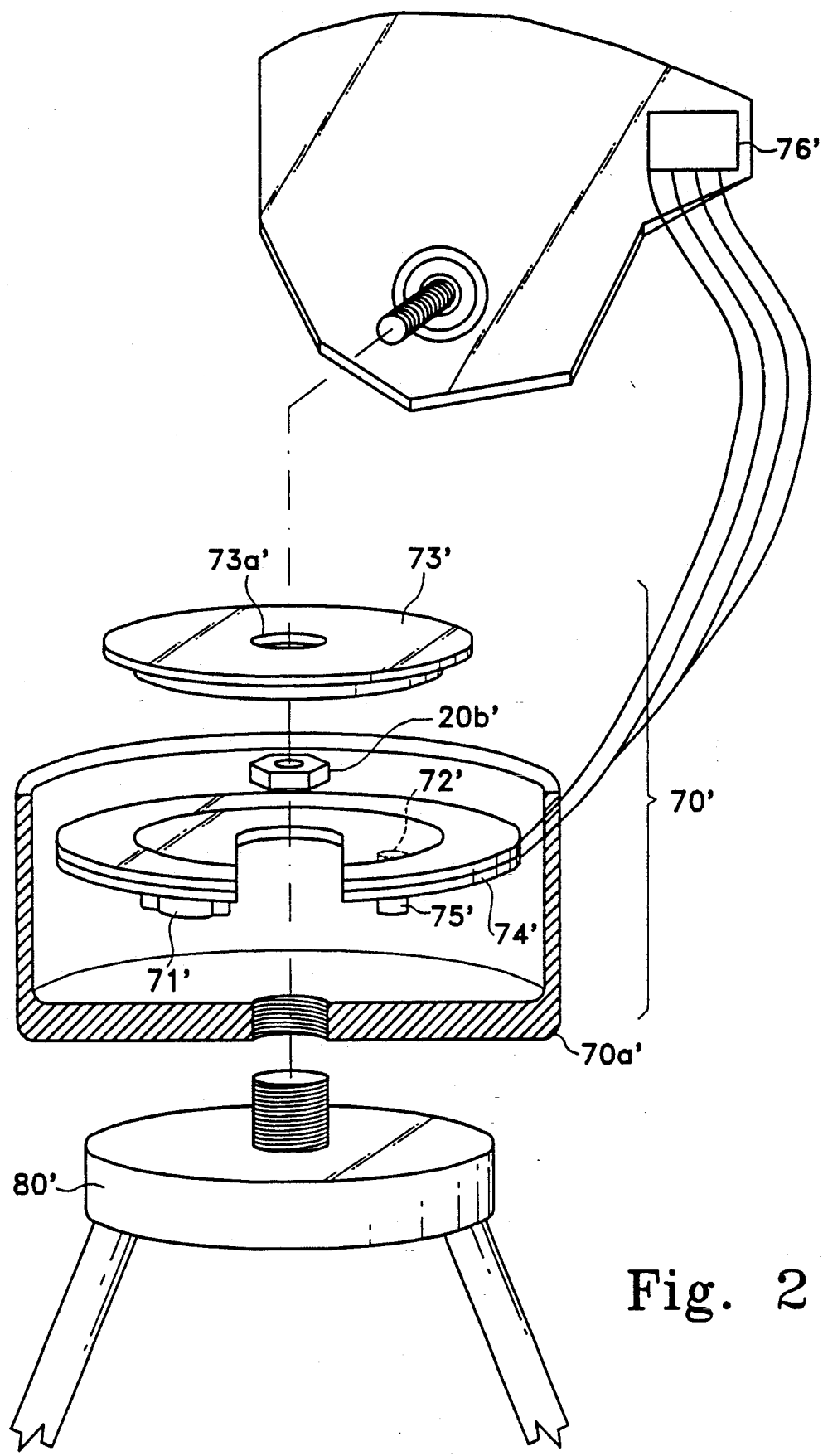
FIG. 2 is an exploded bottom perspective view of the second camera mount.

Second tripod mounting plate 10' includes angular position setting means 15', first order angular position measuring means 11' and second order angular position measuring means 70' (FIG. 2). Angular position setting means 15' comprises the heretofore described camera mounting plate detents 16 disposed in detent slots 15. Detent slots 15 receive a plurality of adjustable camera mounting plate detents 16 in sliding engagement. A central, stationary camera mounting plate detent 17 is disposed in the top surface 10a' of a brace portion 10c of second tripod mounting plate 10' between said detent slots 15 and adjacent to the center graduation 11a of the first order angular position measuring means 11' along a curve defining the lateral disposition of the plurality of adjustable detents 16. The brace portion 10c not only serves to receive the stationary detent 17 but also serves to facilitate prevention of warping and mis-alignment of the protractor 11 and the forward edge 10b of the tripod mounting plate 10 relative to said second camera mounting plate 20'.

First order angular position measuring means 11' substantially comprises a protractor 11 as heretofore described disposed on the top surface 10a' of second tripod mounting plate 10' adjacent to the forward edge 10b' of second tripod mounting plate 10. Protractor 11 is formed having a lateral curvature as generally known in the art and protractor graduations 11a are marked on said protractor 11 to provide means to measure angular positioning of second camera mounting plate 20'. Protractor 11 extends from approximately fifty degrees to the right of a central detent 17 and fifty degrees to the left of the central detent 17 providing an arc of rotation of approximately one hundred degrees. However, the sweep of second camera mounting plate 20' and the related protractor 11 may encompass three hundred sixty degrees without departing from the spirit and scope of the present invention. Camera mounting plate stops 12 are disposed on the top surface 10a' to each side of second tripod mounting plate 10' to provide means to limit the angular rotation of second camera mounting plate 20'. Stops 12 are threadedly attached to stop screw holes 13 which extend vertically through the body of second tripod mounting plate 10'. Major position markings 14 are disposed on the top surface 10a' of second tripod mounting plate 10' between the protractor 11 and the forward edge 10b' of second tripod mounting plate 10'.

As illustrated in FIG. 2 second degree angular position measuring means 70' comprises a rotary encoder 70' communicating with second camera mounting plate 20' as hereinafter described in greater detail. Rotary encoders are generally known in the art for position verification to provide accurate and reliable control of motion. Basically, a rotary encoder converts angular motion into a digital output format. Such output format can be easily interfaced with computers and programmable controllers. Rotary encoder 70' is preferably a rotary incremental optical encoder, a suitable encoder being Model K3-DO-900-5SE-4A manufactured by Lucas Ledex Inc. of Vandalia, Ohio.

Rotary encoder 70' is disposed below second tripod mounting plate 10' and fixedly attaches to a tripod 80'. Rotary encoder 70' includes an encoder housing 70a' having disposed therein encoder electronics 71', an LED light source 72', a rotating encoder disk 73', a stationary mask 74' and a photodetector 75'. A digital display 76' disposed in the second tripod mounting plate 10' communicates with photodetector 75' for easy observance of the measurements of encoder 70' during use. Second camera mounting plate 20' is rotatably attached to the top surface 10a' of the second tripod mounting plate 10' and includes a threaded camera mounting plate stem 20a' which engages a threaded opening 73a' in encoder disk 73' and is secured thereto by plate stem bolt 20b' to fixedly attach encoder disk 73' to second camera mounting plate 20' for equal angular rotation therewith. As known in the art when encoder disk 73' rotates in front of stationary mask 74', it shutters the light from LED light source 72'. The light energy that passes through the mask 74' is received by photodetector 75' which produces pulses in the form of a quasi-sine wave output. Encoder electronics 71' convert the sine wave output into a square wave form, ready for transmission to a counter, for example the digital display 76'. Rotary encoder 70' is preferably a quadrature type encoder. Quadrature type encoders have dual output channels which are phased 90° electrically apart. A result of having two output channels is that the direction of rotation can be determined by monitoring the phase relationship between these two channels. A further benefit of quadrature encoders is the capability of providing very high resolutions by multiplying the number of output pulses. In a dual channel encoder, a four times multiplication of the output count or resolution can be achieved by externally counting the rising and falling edges of each channel. The preferred rotary encoder 70' of the present invention is a quadrature encoder that produces 900 pulses per revolution and can thus generate 3,600 pulses per revolution utililizing this multiplication technique. Therefore rotary encoder 70' is capable of reading an angular position with an accuracy of one-tenth of a degree. The digital display 76' includes direction indication means 76a' and digital numerical data display means 76b' to provide a digital readout to within one-tenth of a degree for movement of second camera mounting plate 20' in either lateral direction.

The respective first order and second order angular position measuring means 11' and 70' provide respectively increasing accuracy for positioning a camera 100 disposed on second camera mount 1'. In combination first order angular position measuring means 11' and second order angular position 70' provide means to practically eliminate natural human differences in interpolating positions on protractor 11. It should be understood that the visual alignment of datum line 24 with the protractor graduations 11a marked on protractor 11 is subject to natural human differences. If two different photographers set the detent positions utilizing the first order angular position measuring means 11' slightly different positionings result due to natural human differences in interpolating between the protractor graduations 11a. Detent positioning utilizing the rotary encoder 70' comprising the second order angular position measuring means results in positioning at substantially the same point by different photographers more often. Thus rotary encoder 70' reduces the "human error" due to natural human differences and further permits a refinement of detent positioning accomplished by use of the first order angular position measuring means 11' alone.

Operation of second camera mount 1' can be best understood by example. To produce a three-screen 50% overlap panorama utilizing a 50 mm, 1.8 AIS Nikkor lens, five slides must be made. Second camera mounting plate 20' is rotated to center detent 17 and the rotary encoder 70' is zeroed. At this position for production of the center slide the digital numerical data display means 76b' indicates "00.0". Camera mounting plate 20 is then rotated to a position where the data display means 76b' indicates "+38.2" degrees. The corresponding wing nut 19 is then tightened to set detent 16 at this position. A detent 16 is then set at "+19.1" degrees. The two remaining detents 16 are then respectively set at "−38.2" and "−19.1". Thus, all five detent positions can be set utilizing only two numbers, one detent position being twice the angular positioning of the other detent position.

The digital numerical data display means 76b' of second camera mount 1' also permits secondary confirmation of detent positions. If the detent settings to each side of center detent 17 are respectively 19.1° and 38.2°, the most widely displaced detents 16 should be 76.4° apart. Thus the detent settings can be checked by rotating second camera mounting plate 20' to the extreme detent 16 on one side, zeroing the rotary encoder 70', and then rotating second camera mounting plate 20' to the opposite extreme detent 16. The digital numerical data display means 76b' should read ±76.4° depending on the direction the second camera mounting plate 20' is initially rotated. Therefore the position of any detent 16 relative to another detent 16 can be easily checked or verified.

Second camera mount 1' can be utilized with any of three different camera lenses: 85 mm, 50 mm or 35 mm lenses. This wide range of lens choices enhances the effects that slide panoramas can have in a multi-screen slide presentation. Slide panoramas that are 72° wide, 114° wide, or 153° wide can be produced utilizing second camera mount 1', a new capability in multi-screen slide presentations.

Various changes and modifications to the preferred embodiments of the camera mount of the present invention may be made without departing from the spirit and scope of the present disclosure. Such changes and modifications within a fair reading of the appended claims are intended as part of the present disclosure.

Therefore, in view of the foregoing, I claim:

1. A camera mount for taking panoramic pictures comprising:

a tripod mounting plate having a top surface, a bottom surface and angular position setting means disposed in said tripod mounting plate;

a camera mounting plate having a top surface and a bottom surface, said camera mounting plate being rotatably attached to the top surface of said tripod mounting by rotatably mounting means to circumscribe an arc of rotation, said camera mounting plate having a roller bearing fixedly attached to the bottom surface of said camera mounting plate which selectively engages the angular position setting means of said tripod mounting plate, camera attachment means being disposed on the top surface of said camera mounting plate;

first order angular position measuring means disposed on said tripod mounting plate for measuring to a first degree of accuracy rotation of said camera mounting plate; and second order angular position measuring means communicating with said camera mounting plate for measuring to a second degree of accuracy rotation of said camera mounting plate, said second degree of accuracy being a more accurate measurement than said first degree of accuracy.

2. A camera mount as described in claim 1 wherein the arc of rotation circumscribed by said camera mounting plate equals 100 degrees.

3. A camera mount as described in claim 1 wherein said angular position setting means comprises a plurality of detents disposed on the top surface of said tripod mounting plate.

4. A camera mount as described in claim 3 wherein said plurality of detents are slidably adjustable along a line parallel to the arc of rotation circumscribed by said camera mounting plate.

5. A camera mount as described in claim 3 wherein the plurality of detents comprises a centrally-disposed stationary detent and a plurality of adjustable detents disposed to each side of said stationary detent, said adjustable detents being slidably adjustable along a line parallel to the arc of rotation of said camera mounting plate.

6. A camera mount as described in claim 1 wherein said second order angular position measuring means comprises a rotary encoder attached to said camera mounting plate to rotate therewith.

7. A camera mount as described in claim 6 wherein said rotary encoder is an optical encoder.

8. A camera mount as described in claim 7 wherein said optical encoder is an incremental encoder.

9. A camera mount as described in claim 8 further including digital numerical data display means communicating with said rotary incremental optical encoder and attached to said tripod mounting plate.

10. A camera mount as described in claim 1 wherein said first order angular position measuring means comprises a protractor having protractor graduations disposed thereon along the arc of rotation of said camera mounting plate at a forward edge of said tripod mounting plate.

11. A camera mount for taking panoramic pictures comprising:
   a tripod mounting plate having a top surface and a bottom surface and including angular position setting means comprising a plurality of detents slidably adjustable in said tripod mounting plate along a line parallel to an arc of rotation circumscribed by a camera mounting plate;
   said camera mounting plate having a top surface and a bottom surface, said camera mounting plate being rotatably attached to the top surface of said tripod mounting plate by rotatably mounting means to circumscribe an arc of rotation, said camera mounting plate having a roller bearing fixedly attached to the bottom surface of said camera mounting plate which selectively engages the angular position setting means of said tripod mounting plate, camera attachment means being disposed on the top surface of said camera mounting plate;
   first order angular position measuring means comprising a protractor having protractor graduations disposed thereon along the arc of rotation of said camera mounting plate; and
   second order angular position measuring means comprising a rotary encoder operably attached to the camera mounting plate.

12. A camera mount as described in claim 11 wherein the angular position setting means comprises a centrally-disposed stationary detent and a plurality of adjustable detents disposed to each side of said stationary detent, said adjustable detents being slidably adjustable along a line parallel to the arc of rotation of said camera mounting plate.

13. A camera mount as described in claim 11 wherein said rotary encoder is an optical encoder.

14. A camera mount as described in claim 13 wherein said optical encoder is an incremental encoder.

15. A camera mount as described in claim 11 further including digital numerical data display means communicating with said rotary encoder and attached to said tripod mounting plate.

* * * * *